United States Patent
Lutz et al.

(10) Patent No.: US 10,354,071 B2
(45) Date of Patent: Jul. 16, 2019

(54) METHOD FOR UPDATING PROCESS OBJECTS IN AN ENGINEERING SYSTEM

(71) Applicant: SIEMENS AKTIENGESELLSCHAFT, Munich (DE)

(72) Inventors: Benjamin Lutz, Pfinztal (DE); Anna Palmin, Karlsruhe (DE)

(73) Assignee: Siemens Aktiengesellschaft, Munich (DE)

( * ) Notice: Subject to any disclaimer, the term of this patent is extended or adjusted under 35 U.S.C. 154(b) by 80 days.

(21) Appl. No.: 15/635,743

(22) Filed: Jun. 28, 2017

(65) Prior Publication Data
US 2018/0004949 A1   Jan. 4, 2018

(30) Foreign Application Priority Data
Jun. 30, 2016  (EP) .................................... 16177236

(51) Int. Cl.
| | |
|---|---|
| G06F 21/55 | (2013.01) |
| G06F 21/56 | (2013.01) |
| G06F 16/17 | (2019.01) |
| G06F 17/50 | (2006.01) |
| G05B 19/042 | (2006.01) |

(52) U.S. Cl.
CPC ....... *G06F 21/566* (2013.01); *G05B 19/0428* (2013.01); *G06F 16/1734* (2019.01); *G06F 17/5004* (2013.01); *G06F 21/554* (2013.01); *G05B 2219/24169* (2013.01); *Y02P 90/265* (2015.11)

(58) Field of Classification Search
CPC ............ G06F 21/566; G06F 17/30144; G06F 17/5004; G06F 21/554; G05B 19/0428; G05B 2219/24169; Y02P 90/02
See application file for complete search history.

(56) References Cited

U.S. PATENT DOCUMENTS

| | | | | |
|---|---|---|---|---|
| 5,768,119 A | * | 6/1998 | Havekost | ............. G05B 19/409 700/4 |
| 5,812,130 A | * | 9/1998 | Van Huben | ............. G06Q 10/10 399/81 |
| 5,950,201 A | * | 9/1999 | Van Huben | ............. G06F 17/50 |
| 6,088,693 A | * | 7/2000 | Van Huben | ......... G06F 17/3056 |

(Continued)

FOREIGN PATENT DOCUMENTS

EP    1868055    12/2007

OTHER PUBLICATIONS

Das Prozessleitsystem SIMATIC PCS 7, 2016.
European Search Reported dated Mar. 1, 2017 which issued in the corresponding European application No. 16177236.3.

*Primary Examiner* — Joseph P Hirl
*Assistant Examiner* — Stephen T Gundry
(74) *Attorney, Agent, or Firm* — Cozen O'Connor (57) ABSTRACT

A method for updating process objects of an automation project stored in an engineering system, wherein an automation device is designed and/or configured via the engineering system to control a technical process and wherein, furthermore, the technical process to be controlled can be operated and monitored via an operator system in which changes to process objects made during the run-time are not lost but secured and are automatically "updated" or "traced" in the engineering system.

12 Claims, 4 Drawing Sheets

(56) References Cited

U.S. PATENT DOCUMENTS

| | | | | |
|---|---|---|---|---|
| 6,571,285 B1* | 5/2003 | Groath | | H04L 41/0631 370/352 |
| 6,643,555 B1* | 11/2003 | Eller | | G05B 19/0426 700/17 |
| 6,785,805 B1* | 8/2004 | House | | G06Q 10/087 700/90 |
| 6,788,980 B1* | 9/2004 | Johnson | | G05B 19/042 700/1 |
| 6,868,370 B1* | 3/2005 | Burbridge | | G06Q 10/06 703/1 |
| 2006/0206866 A1* | 9/2006 | Eldrige | | G05B 15/02 717/122 |
| 2007/0073750 A1* | 3/2007 | Chand | | G05B 19/056 |
| 2007/0240154 A1* | 10/2007 | Gerzymisch | | G06F 8/61 717/174 |
| 2008/0005552 A1* | 1/2008 | DiStefano | | G05B 19/0428 713/2 |
| 2008/0195963 A1* | 8/2008 | Eisen | | G06Q 10/06 715/772 |
| 2009/0138967 A1* | 5/2009 | Faieta | | G06F 21/554 726/22 |
| 2010/0131084 A1* | 5/2010 | Van Camp | | G06F 8/65 700/86 |
| 2011/0178935 A1* | 7/2011 | Chaubey | | G06Q 10/06 705/301 |
| 2012/0266209 A1* | 10/2012 | Gooding | | H04L 63/20 726/1 |
| 2013/0138818 A1* | 5/2013 | Wolf | | G05B 19/4185 709/227 |
| 2014/0173637 A1* | 6/2014 | Becker | | G05B 23/0272 719/318 |
| 2014/0200688 A1* | 7/2014 | Wilke | | G05B 19/0426 700/83 |
| 2014/0214758 A1* | 7/2014 | Tripathi | | G06F 16/93 707/608 |
| 2015/0105875 A1* | 4/2015 | Tran | | G05B 15/02 700/83 |
| 2015/0105876 A1* | 4/2015 | Tran | | G05B 23/0272 700/83 |
| 2015/0105893 A1* | 4/2015 | Tran | | G05B 15/02 700/108 |
| 2015/0106506 A1* | 4/2015 | Weinrich | | G05B 23/0267 709/224 |
| 2015/0106753 A1* | 4/2015 | Tran | | G05B 23/0272 715/765 |
| 2015/0199405 A1* | 7/2015 | Redlich | | G06Q 10/10 707/770 |
| 2016/0266566 A1* | 9/2016 | Lutz | | G05B 19/056 |
| 2016/0300001 A1* | 10/2016 | Drumm | | G05B 17/02 |
| 2016/0320762 A1* | 11/2016 | Lutz | | G05B 19/0426 |
| 2017/0139702 A1* | 5/2017 | You | | G06Q 10/103 |
| 2017/0177845 A1* | 6/2017 | Botti | | G06F 21/316 |
| 2017/0300042 A1* | 10/2017 | Pauly | | G05B 19/4186 |
| 2017/0357253 A1* | 12/2017 | Kilpatrick | | G05B 23/0264 |
| 2018/0101164 A1* | 4/2018 | Noetzelmann | | G05B 19/4188 |
| 2018/0107195 A1* | 4/2018 | Noetzelmann | | G05B 19/418 |

\* cited by examiner

METHOD FOR UPDATING PROCESS OBJECTS IN AN ENGINEERING SYSTEM

BACKGROUND OF THE INVENTION

1. Field of the Invention

The invention relates to an arrangement method for updating process objects of an automation project stored in an engineering system, where an automation device can be designed and/or configured via the engineering system to control a technical process and where, furthermore, the technical process to be controlled is operable and monitored via an operator system. The invention relates, moreover, to an arrangement for carrying out the method.

2. Description of the Related Art

Siemens brochure "Das Prozessleitsystem SIMATIC PCS 7" ["The process control system SIMATIC PCS 7"], 2016 discloses an engineering system that is provided for creating an automation project, where via the engineering system, automation components can be designed, configured, and parameterized to control a technical process or to achieve an automation task. The engineering system enables, e.g., engineering of a network, communications or other hardware components and engineering of software component. Software components of this kind are, for example, what are known as "Continuous Function Charts" (CFCs), which implement or represent modules for the automation of individual system parts and measuring points, e.g., measuring points in the form of controllers. Once a user has created all functions in a CFC function plan according to the control task to be achieved, the engineering system generates automation objects or CFC functions from this CFC plan and these are loaded into one or more automation device(s) and are processed there in the course of control of a technical process or to achieve the automation task. For the sake of simplicity, the CFC modules and the automation objects operatively connected to these modules and loaded in the automation device will hereinafter be called a process object.

The Siemens brochure, moreover, describes an operator that enables convenient and secure process monitoring and process management for an operator. If required, the operator can intervene in the control of the process sequence, and this means that the operator can operate and monitor the technical process to be controlled.

The situation can occur where the operator intervenes in the ongoing process at the OS client of the operator station during control of the process, i.e., during the run time of the automation, in that the operator changes, for example, a parameter, such as a threshold value, of a controller module stored in one of the automation devices. This change is loaded via the OS server of the operator station into the automation device. For the case where the engineering system re-loads the automation objects or CFC functions into the automation device because, for example, the CPU of this automation device is being replaced and the automation project has to be re-loaded, the change made by the operator during the run time is overwritten in the automation device, and this means that the process object changed during the run time is lost and is again replaced by the process object originally created in the engineering.

SUMMARY OF THE INVENTION

In view of the foregoing, it is an object of the present invention to provide an arrangement and method which avoids the aforementioned drawbacks.

This and other objects and advantages are achieved in accordance with the invention by an arrangement and method by which changes to process objects made during the run time are not lost but advantageously secured and automatically "updated" or "traced" in the engineering system, and this will also be called "back annotation" hereinafter. The engineering system does not need to be constantly switched online because the changes are stored in the archive server. As soon as the engineering system is connected to the archive server, changes are automatically transferred into the engineering system.

The integrity check of the integrity feature (for example, a check sum or a digital signature), ensures that any unauthorized manipulation made during the run time, by which (with renewed loading of the process objects into the automation device) the automation device could be brought into an inadmissible state, is avoided. Furthermore, during the course of the check, a check is made via the comparison with the users configured in the system and their rights as to whether the user, who triggered the change, was even authorized to effect a change of this kind. This ensures that any change made by an unauthorized user is immediately recognized and rejected, and this means that a change of this kind is not adopted (in the automation project) by the engineering system.

In one embodiment of the invention, the operating alarm is supplemented by a marker alarm via the operator system, where the marker alarm signals a grouping of changes. As a result, a plurality of chronological changes, such as a series of parameter adjustments of various process objects in order to optimize sub-processes, are combined.

In a further embodiment of the invention, the archive server acknowledges a change adopted in the automation project by the engineering system. This ensures that the archive server no longer provides the engineering system with the change for reading.

In a particular embodiment of the invention, a change that is not adopted in the automation project is displayed via the archive servers for the operator system. This points to the fact that the engineering system is not switched online or that the result of the integrity check or the comparison prevented adoption of the change.

In a further particular embodiment of the invention, changes adopted in the automation project as well as changes not adopted in the automation project are stored in a Security Information and Event Management (SIEM) system. Measures of this kind enable a timely and appropriate response to discovered deviations/guideline infringements and consideration of the events in the context of a "forensic" evaluation. One possible response to a discovered attempt to make an unauthorized change or to a discovered inconsistency can be, for example, that a system administrator and/or security experts is/are informed of this immediately via the SIEM system. Furthermore, it is also possible to fully automate the responses.

For the case where an operator effects a change to a process object (hereinafter also called an engineering-relevant input) during the run time of the automation device via an appropriate input at an OS client of an operator system, then this input is displayed for an automation device via the process image in an OS server of the operator system. In addition to entry in the process image, an input of this kind, e.g., the change or the adjustment of a parameter of a controller, generates an alarm in the form of an operating alarm, with this operating alarm comprising the change as well as user-, action- and/or process object-based (associated) values. The operating alarm, which is provided to protect against unauthorized operator inputs, can be provided, for example, with the following associated values:
User name, Claim (UMC) . . . (who triggered the action?),
time stamp (when was the action triggered?),
process object identifier, member identifier . . . , or
location (where or on which region of the system or on which object was the triggered action based, area, . . . subsystem, equipment module).

In addition to the user-, action- and/or process object-based (associated) values, the operating alarm comprises an integrity feature "$Sig_A$ to alarm A" to protect the operating alarm A against unnoticed manipulation, where the integrity feature can be generated as follows:

$$Sig_A=Sig\_Gen(A),$$

$$A=A\|Sig_A,$$

where
Sig_Gen is a signature generating method (e.g., based on the what are known as elliptical curves or RSA) and the sign "$\|$" denotes the concatenation.

By way of the verification of $Sig_A$ using a signature verification method (Sig_Ver) corresponding to the signature generating method, the engineering system can check at any time whether the alarm A has been manipulated. If the result of the signature verification is "false", then this points to a manipulated alarm A.

With the engineering system, a corresponding "Security Event" is generated, moreover. This "Security Event" comprises the information contained in the alarm and can include further information (preferably network-specific information) with the "Security Event" being stored in a local event storage device, is optionally transmitted to a dedicated central instance (e.g. to a SIEM system). This enables recognition of attacks and deviations during the run time as well as consideration of this event during a subsequent forensic evaluation.

So that, e.g., a plurality of chronological engineering-relevant inputs can be combined (for example, a series of parameter adjustments of different process objects to optimize a sub-process), marker alarms are provided, moreover. Once the operator has input all chronological engineering-relevant changes, the OS server of the operator station generates a marker message or a marker alarm, which describes, e.g., what the aim of the last engineering-relevant inputs was. All messages between two markers represent a section. Sections of this kind are advantageous if in the engineering a "rollback", for example, is made ("undo the optimization of the sub-process A in section 334 between marker optimization 1 and optimization 2"). To ensure the integrity of the sections enclosed between the two markers M1 and M2, the marker M2, which identifies the end of the section, is supplemented by an integrity feature $Sig_{M2}$ (in the form of a separate associated value). The integrity feature $Sig_{M2}$ can be generated as follows:

$$Sig_{M2}=Sig\_Gen(M1\|E1\|E2\| \ldots \|En\|M2),$$

$$M2=M2\|SigM2$$

where
Sig_Gen is a signature generating method (e.g. based on what are known as elliptical curves or RSA)
Ei, i=1 to i=n, are the individual inputs enclosed between the marker alarms M1 and M2 and
the sign "$\|$" denotes the concatenation.

By way of the verification of $Sig_{M2}$ using the signature verification method (Sig_Ver) corresponding to the signature generating method, it can also be checked here at any time whether the marker M2 or the inputs enclosed between M1 and M2 have been manipulated. If the result of the signature verification is "false", then this points toward a manipulated marker alarm M or to a manipulation of one or more input(s) within the associated section. The signature is generated on the OS server of the operator station using what is known as a Private Key, which is securely stored. The associated Public Key, which is required for signature verification, should ideally be provided as a component of an associated cryptographic certificate by a project-specific or system-wide "Certification Authority" as a component of a "Public Key Infrastructure (PKI)".

The engineering system does not need to be constantly switched online because the changes are stored in the archive server. As soon as the engineering system is connected to the archive server, a request for the operating and marker alarms is transmitted by the engineering system to the archive server, the receipt of which request the engineering system has so far not yet acknowledged. The engineering system reads in the as yet unacknowledged alarms, with the engineering system interpreting and checking the alarms. The following steps are provided for this purpose:

a) firstly, a verification of the integrity feature (using the verification method Sig_Ver) is performed to determine whether the operating and marker alarms have not been manipulated.

b) a check is then performed to determine whether the operator even had the appropriate rights to implement the changes made to the process objects, whereby unauthorized changes, in particular, are ruled out. For this purpose user-, action- and/or process object-based values are compared with the predefined values stored in the engineering system, c) optionally (to improve the operator checking of rights) the engineering system can also decode the change and compare or verify it online with the corresponding process object of the automation device, d) the change is made in the engineering system and acknowledged by the archive server, e) in the case of inconsistencies, such as owing to different parameters or because the process object is no longer present in the engineering system, a corresponding message is output (graphic dialog) on the OS client of the operator station, so that the project manager can act accordingly. If the change is "rejected", then this "rejection" is also stored in the archive server.

The results of the implementation of steps a) to e), in particular the results of the checks made, are mapped on corresponding security events that can be transmitted to a dedicated central instance, such as a central instance in the form of a Security Information and Event Management (SIEM) system. This enables, in particular, an appropriate response to deviations and/or guideline infringements of this kind.

Other objects and features of the present invention will become apparent from the following detailed description considered in conjunction with the accompanying drawings. It should be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention, its embodiments and advantages will be described in more detail below with reference to the drawings, in which an exemplary embodiment of the invention is illustrate, in which.

DETAILED DESCRIPTION OF THE EXEMPLARY EMBODIMENTS

Figure 1:
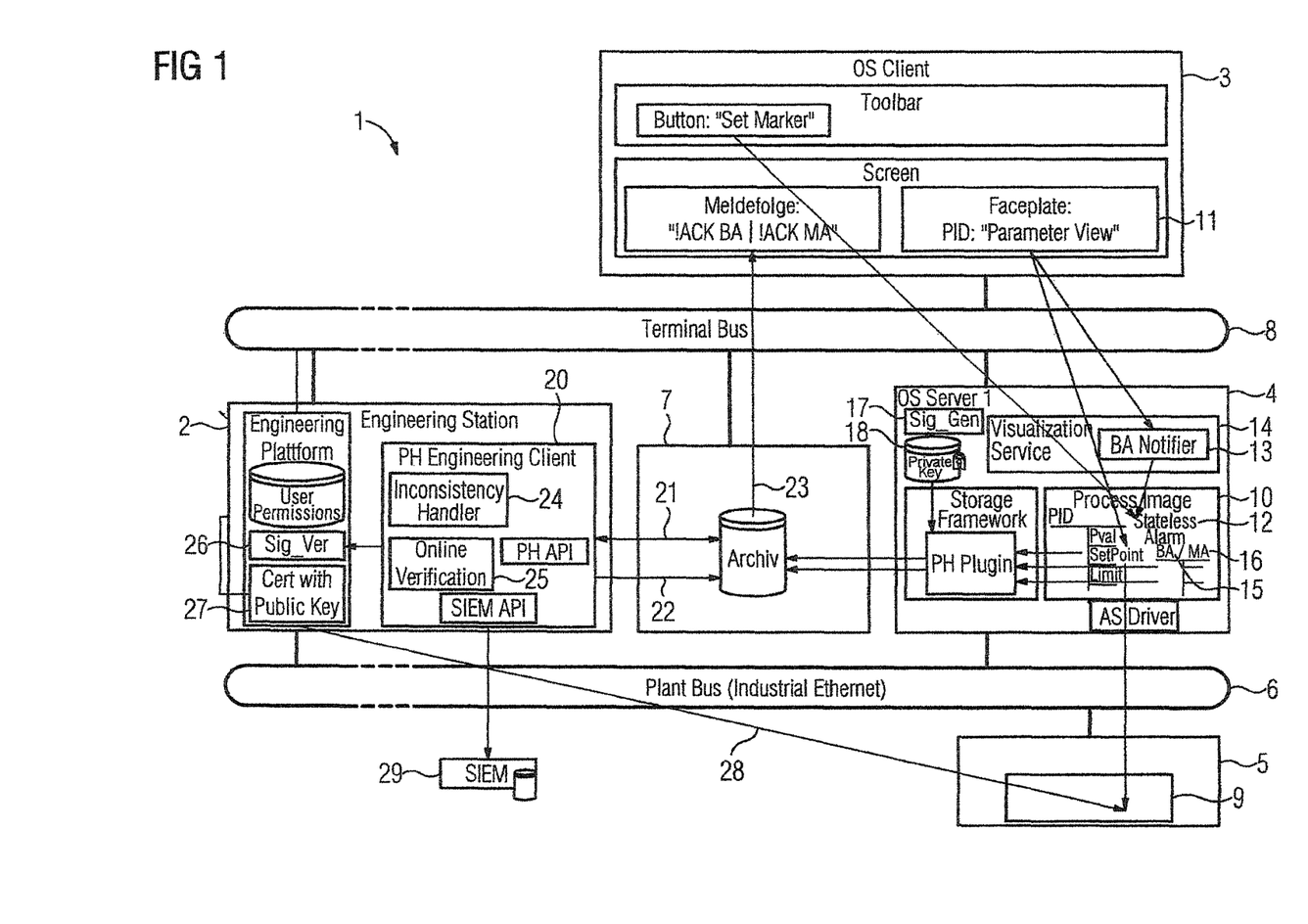
FIG. 1 shows a process control system in accordance with the invention.
Figure 2:
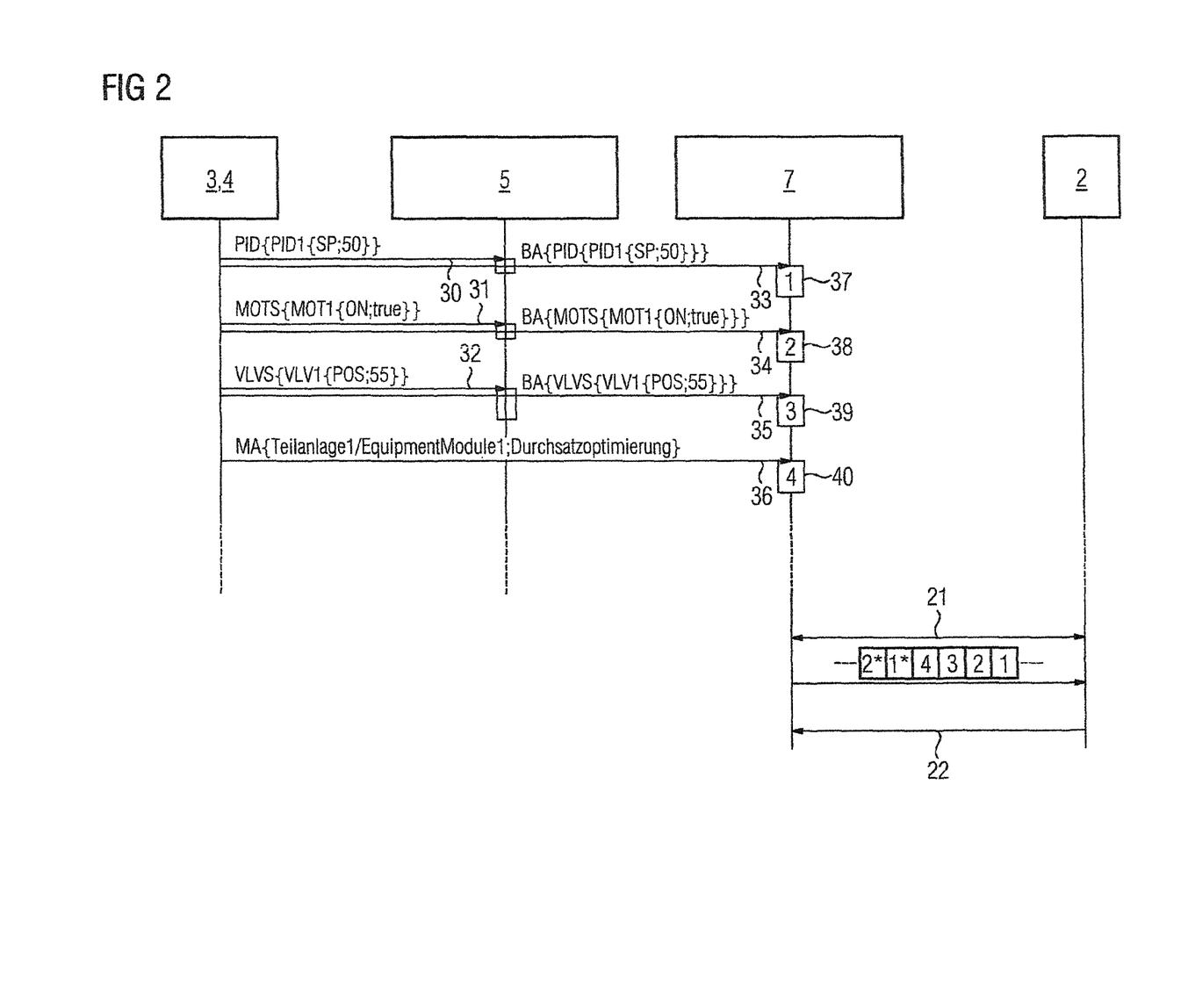
FIG. 2 shows a sequence diagram in accordance with the invention.
Figure 3:
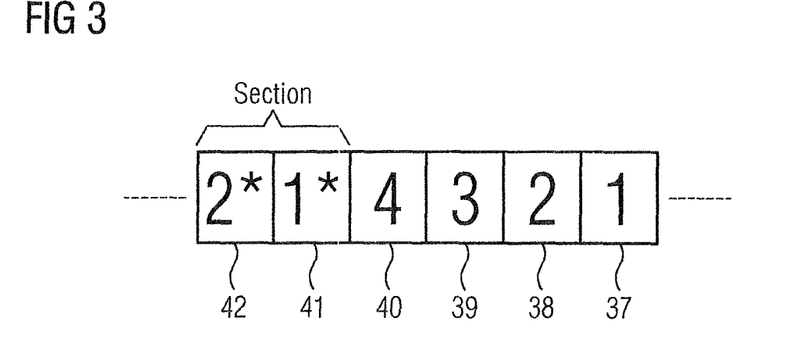
FIG. 3 shows the construction of an alarm; in accordance with the invention.

The identical parts shown in FIGS. 1 to 3 are provided with identical reference numerals.

In FIG. 1, reference numeral 1 denotes components of a process control system that comprises an engineering system 2, an operator system provided with an OS client 3 and an OS server 4 as well as a large number of automation components of an automation device. In the present exemplary embodiment, for the sake of simplicity and a better overview, only one automation component is shown in the form of an automation device 5. It should be understood the automation device comprises a large number of automation components to control a system or a technical process, such as a large number of automation devices or a large number of decentralized peripherals, which are connected to the automation devices by a field bus. The automation devices and the decentralized peripherals have intelligent CPU- and/or interface assemblies and a large number of process input and process output assemblies, with sensors being connected to the respective process input assemblies and actuators being connected to the respective process output assemblies. The automation device 5, the further automation devices (not shown here) and decentralized peripherals as well as the engineering system 2 and the OS server 4 are connected to a system bus 6, where the engineering system 2, the operator system 3, 4 and an archive server 7 are moreover connected together by a terminal bus 8.

With the engineering system 2, a project manager creates an automation project in accordance with an automation task to be achieved, with the project manager designing, configuring and parameterizing the automation device via suitable software of the engineering system 2. In the present exemplary embodiment, it is assumed that an appropriately designed, configured and parameterized process object is stored in the automation device 5 as a controller module 9 that is processed during the process control by a CPU of the automation device 5.

The operator system 3, 4 enables convenient and safe process monitoring and process management for an operator, where, if required, the operator can intervene in the control of the process sequence, and this means that in the present example the operator can "operate and monitor" the controller module 9 that is to be processed by the automation device 5. For this purpose, the operator accesses via the OS client 3 operating and monitoring software stored in the OS server which is configured in such a way so as to be able to read and/or write access a process image 10 stored in the OS server 4, in order to change or influence, for example, parameters (threshold values, desired values, . . . ) of the controller module 9.

In the following, it is assumed that the operator changes a parameter in the controller module 9 during the run operation of the automation device 5 via a faceplate 11 of the OS client 3. To "update" this change in the automation project of the engineering system 2. as well as to thereby update the controller module 9 in the automation project, the process image 10 has what is known as a stateless alarm 12 in which, owing to the change in parameter, a BA notifier 13 of a Visualization Service 14 of the operator and monitoring software of the OS server 4 generates an operating alarm 15 and a marker alarm 16 and writes the change into the process image 10. The marker alarm 16 is only generated if the operator triggered these operating alarms, "logically" connected for structuring, via a button and a corresponding dialog in the graphic operator interface of the OS client 3.

The OS server 4 has lettering means which provide the operating and marker alarm 15, 16 with an integrity feature in the form of a digital signature, with a signature generating method 17 (Sig_Gen) and a Private Key 19 required for signature generation being provided on the OS server 4. The Private Key is of course kept confidential, so that it cannot be compromised. The operating and marker alarms 15, 16 are protected against unauthorized manipulations via an integrity feature of this kind. Safekeeping can be implemented via a highly secure database. In addition to this integrity feature, user-, action- and/or process object-based values are associated with the operating and marker alarms 15, 16 to protect against unauthorized changes to the controller module, for example, associated values in the form of an operator name (who triggered the change or action?), a time stamp (when was the change or action triggered?) and/or a controller identifier. The operating and marker alarms 15, 16 provided with the integrity feature and with associated values are supplied via a Storage Framework 19 of the OS server 4 to the archive server 7 and archived there.

To transmit the change in parameter stored on the archive server into the engineering system 2 at any time and to adopt the change there in the automation project (so the change made during the run time is not lost when the automation project is next downloaded into the automation device 5 by the engineering system 2) the engineering system 2 has a software component PH engineering client 20. This is designed to implement requests in the archive server 7 to read out the change made during the run time (engineering-relevant date) in the form of the operating and marker alarms 15, 16 and to acknowledge reading out (double arrow 21). For the case where the engineering system 2 has adopted the change in the automation project, the PH engineering client 20 acknowledges the adoption (arrow 22), so that the operating and marker alarms 15, 16 are prevented from being read in again at a later time.

The archive server 2 indicates to the OS client 3 and therefore the operator whether the change has already been adopted by the engineering system 2. For this purpose, the archive server 7 transmits a message sequence 23, which comprises changes not yet acknowledged by the engineering system 2, to the OS client 3. A graphic display of the unacknowledged operating and marker alarms is possible via this message sequence display.

The PH engineering client 20 comprises, moreover, two further software components 24, 25 (Inconsistency Handler and Online Verification) that effect the following measures when the change (the engineering-relevant date) is read into the engineering system 2:

1) The software component 24 (Inconsistency Handler) checks via the verification of the integrity feature (using the verification method 26 (Sig_Ver) and the Public Key 27 available to it) whether the operating and marker alarms 15, 16 have not been manipulated.

2) The software-component 25 then checks by comparing the user-, action- and/or process object-based values of the operating alarm 15 with the predefined values stored in the engineering system 2. Here, the users together with their authorization are stored in the engineering system 2, whereby it is possible to check whether the operator even has the appropriate rights to change the parameter. This rules out unauthorized changes.

3) To improve operator rights checking the engineering system can optionally also decode the change and compare or verify the change (arrow 28) online with the corresponding controller module 19 of the automation device 5.

4) For the case where the results of verification and comparison are consistent, the change is adopted in the automation project in the engineering system 2 and acknowledged by the archive server 7 (arrow 22).

5) If, by contrast, the results are contradictory or inconsistent, the change is not adopted in the automation project, with the rejected change being shown to the operator (arrow 23).

As already described, the results of implementation of steps (1) to (5), in particular the results of the tests performed are mapped on corresponding security events that are transmitted to a Security Information and Event Management (SIEM) system 29. This enables, in particular, an appropriate response to deviations and/or guidelines infringements of this kind.

With reference to FIG. 2, shown therein is an exemplary sequence diagram of the process optimization by the operator via the OS client 3 of the operator system 3, 4 and the automation device 5, generation and archiving of operating and marker alarms through to secured and decoupled updating (back annotation) of the changes in parameter in the engineering system 2. With any relevant change in the parameters of the process (e.g., change in a default valve setting of VLVS) by the operator system 3, 4, the corresponding operating alarm is simultaneously generated that comprises (as associated values) all information (process object, parameter, value) to be able to transmit this change at a subsequent time from the archive server 7 into the engineering system 2. During the course of the optimization, which can include a large number of changes in parameter, the operator can generate a marker alarm that marks the optimization made as a section and as information contains a description as to which background the optimization had. The protection of the marker alarms and the sections enclosed between two marker alarms against unnoticed manipulations is achieved (as described) by the generation of an integrity feature in which a sequence diagram and the construction of an alarm are displayed.

In the present exemplary embodiment, it is assumed that an operator has made a change to a parameter at a controller module (PID), a motor module (MOT) and a valve module (VLSV), and this is illustrated in FIG. 2 by reference numerals 30 to 32. These changes are transmitted to the automation device 5 and simultaneously therewith an operating alarm 33 to 35 is transmitted to the archive server 7 for each change which is stored in the archive server 7 in memory areas 37, 38, 39. Furthermore, the operator generated a marker alarm 36 up to a time and this is stored in a memory area 40 of the archive servers 7. At a subsequent time, the engineering system 2 reads out the memory areas 37, 38, 39, 40 and therefore the operating and marker alarms and acknowledges in the described manner reading out of the alarms and (for the case where the changes were adopted in the automation project) the adoption of these changes.

FIG. 3 shows a detail of the construction in sections of the engineering-relevant operating alarms 37 to 41 separated by the marker alarms 40, 42. These marker alarms 40, 42 are used not only for structuring, in order to be able to distinguish between different optimization processes during the run time, but also to create the possibility of dedicated rollbacks of individual optimizations in the engineering system 2. In order to prevent a back annotation of engineering-relevant data from the archive server 7 into the engineering system 2 from occurring multiple times, an acknowledgement is written back into the archive server 7 following each reading of a section into the engineering system 2.

Figure 4:
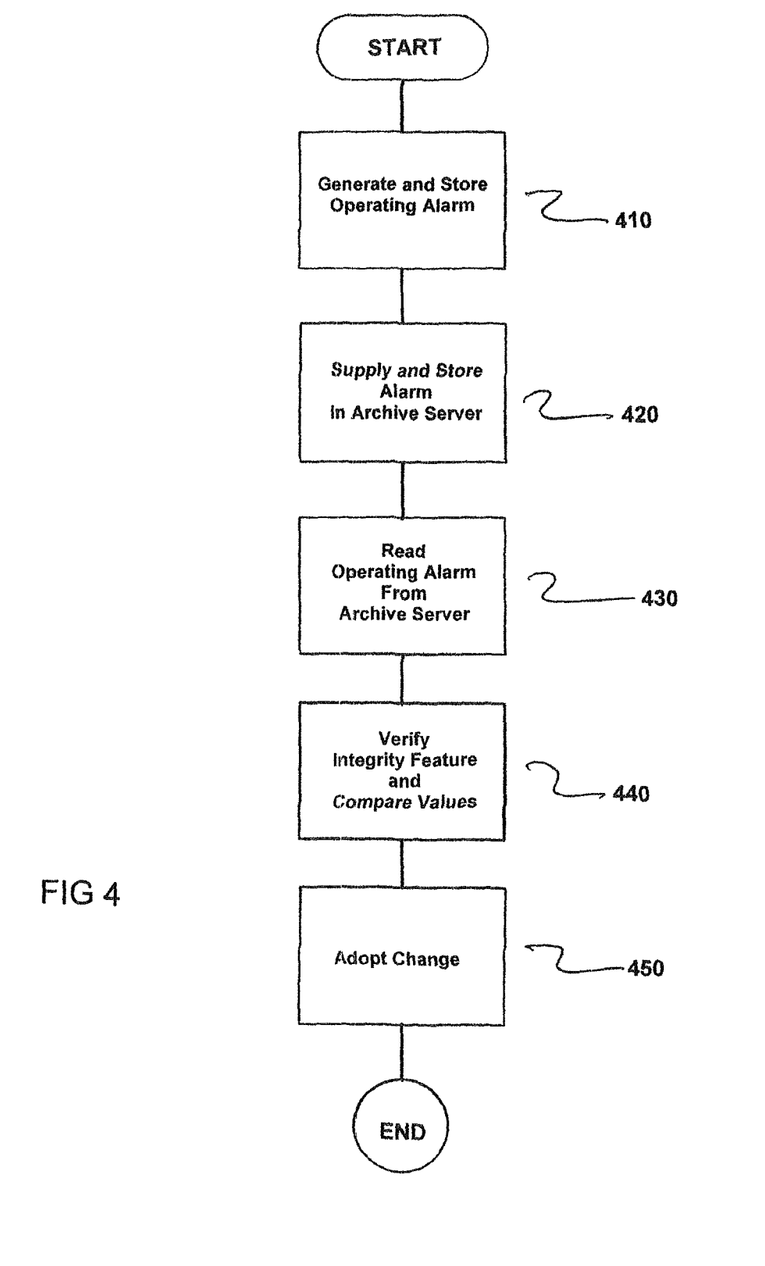
FIG. 4 is a flowchart of the method in accordance with the invention.

FIG. 4 is a flowchart of the method for updating process objects of an automation project stored in an engineering system 2, where an automation device 5 is either (i) designed and/or (ii) configured via the engineering system 2 to control a technical process, and the technical process to be controlled is operable and monitored via an operator system 3, 4. In cases where a change to at least one process object of the process objects is effected during the process control via the operator system 3, 4, the method comprising generating an operating alarm 15 via the operator system 3, 4 and storing the alarm in a process image 10 of the operator system 3, 4, as indicated in step 410. In accordance with the invention, the operating alarm 15 comprises (a) the change and at least one of (i) user object-based values, (ii) action object-based values and (iii) process object-based values to protect against unauthorized changes at the at least one process object of the process objects and (b) an integrity feature to protect the operating alarm 15 against manipulations.

Next, the operating alarm 15 is supplied to an archive server 7 and storing the supplied operating alarm 15 in the archive server 7, as indicated in step 420.

Next, the supplied operating alarm 15 is read from the archive server 7 via the engineering system 2, as indicated in step 430.

The integrity feature is now verified via the engineering system 2 at least one of (i) the user object-based values, (ii) the action object-based values and (iii) process object-based values is compared with predefined values stored in the engineering system 2 via the engineering system 2, as indicated in step 440.

Next, the change at the at least one process object in the automation project is adopted via the engineering system (2) as a function of results of the verification and the comparison, as indicated in step 450.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for updating process objects of an automation project stored in an engineering system, wherein an automation device being at least one of (i) designed and (ii) configured via the engineering system to control a technical process, and the technical process to be controlled being operable and monitored via an operator system, in cases where a change to at least one process object of the process objects is effected during the control of the technical process via the operator system, the method comprising:

generating an operating alarm via the operator system and storing the generated operating alarm in a process image of the operator system, the operating alarm comprising (a) the change and at least one of (i) an operator name, (ii) a time stamp and (iii) a controller identifier to protect against unauthorized changes at the at least one process object of the process objects and (b) an integrity feature to protect the operating alarm against manipulations;

supplying the operating alarm to an archive server and storing the supplied operating alarm in the archive server;

reading the operating alarm from the archive server via the engineering system;

verifying the integrity feature via the engineering system and comparing at least one of (i) the operator name, (ii) the time stamp and (iii) the controller identifier with predefined parameters stored in the engineering system via the engineering system;

operating the engineering system and adopting the change at the at least one process object in the automation project during the control of the technical process via the engineering system as a function of results of the verification and the comparison.

2. The method as claimed in claim 1, further comprising:
supplementing the operating alarm by a marker alarm via the operator system, said marker alarm signaling a grouping of changes.

3. The method as claimed in claim 1, wherein a change adopted in the automation project by the engineering system is acknowledged by the archive server.

4. The method as claimed in claim 2, wherein a change adopted in the automation project by the engineering system is acknowledged by the archive server.

5. The method as claimed in claim 3, wherein a change of the archive servers for an operating system (OS) client of the operator system is not adopted in the automation project.

6. The method as claimed in claim 1, wherein changes adopted in the automation project and changes not adopted in the automation project are stored in a Security Information and Event Management (SIEM) system.

7. An arrangement having an engineering system including a processor and associated memory and an operator system including a respective processor and associated memory, an automation project having process objects being stored in the engineering system and an automation device is at least one of designable and configurable via the engineering system including the processor and associated memory to control a technical process, and the technical process to be controlled being operable and monitored via operator system including the respective processor and associated memory;

wherein, in order to update at least one of the process objects in the automation project during the control of the technical process in cases of a change to the at least one process object, the operator system including the respective processor and associated memory generates an operating alarm and stores said generated operating alarm in a process image of the operator system, said operating alarm comprising (a) the change and at least one of (i) an operator name, (ii) a time stamp and (iii) a controller identifier to protect against unauthorized changes at the at least one process object and (b) an integrity feature to protect the operating alarm against manipulations, the operator system including the respective processor and associated memory additionally supplies the operating alarm to an archive server, the engineering system including the processor and associated memory reads the operating alarm from the archive server, the engineering system including the processor and associated memory additionally verifies the integrity feature and compares at least one of (i) the operator name, (ii) the time stamp and (iii) the controller identifier with predefined parameters stored in the engineering system including the processor and associated memory; and wherein the engineering system including the processor and associated memory adopts the change to the at least one process object in the automation project as a function of results of the verification and the comparison.

8. The arrangement as claimed in claim 7, wherein the operator system including the respective processor and associated memory supplements the operating alarm by a marker alarm which signals a grouping of changes.

9. The arrangement as claimed in claim 7, wherein the engineering system including the processor and associated memory acknowledges a change adopted in the automation project by the archive server.

10. The arrangement as claimed in claim 8, wherein the engineering system including the processor and associated memory acknowledges a change adopted in the automation project by the archive server.

11. The arrangement as claimed in claim 9, wherein the archive server displays a change in the automation project for an operating system (OS) client of the operator system which is not adopted.

12. The arrangement as claimed in claim 7, wherein the engineering system including the processor and associated memory stores changes adopted in the automation project and changes not adopted in the automation project in a Security Information and Event Management system (SIEM).

* * * * *